(12) United States Patent
Kawamura

(10) Patent No.: US 6,743,378 B2
(45) Date of Patent: Jun. 1, 2004

(54) PLASMA DISPLAY PANEL WITH IMPROVED MIXED GREEN-COLOR FLUORESCENT MATERIAL

(75) Inventor: Hiroshi Kawamura, Tokyo (JP)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 10/173,802

(22) Filed: Jun. 19, 2002

(65) Prior Publication Data

US 2002/0195938 A1 Dec. 26, 2002

(30) Foreign Application Priority Data

Jun. 21, 2001 (JP) .................................... 2001-188403

(51) Int. Cl.$^7$ ............................................. C09K 11/08
(52) U.S. Cl. ................. 252/301.4 R; 252/301.4 S; 252/301.4 F; 252/301.4 H; 252/301.4 P; 252/301.5; 252/301.6 R; 252/301.6 S; 313/582; 313/584; 313/467; 313/497; 313/503; 313/463

(58) Field of Search .................................. 252/301.4 H

(56) References Cited

FOREIGN PATENT DOCUMENTS

| JP | 2001-84911 A | 3/2001 |
|---|---|---|
| JP | 2001-135239 A | 5/2001 |

*Primary Examiner*—C. Melissa Koslow
(74) *Attorney, Agent, or Firm*—Sughrue Mion, PLLC

(57) ABSTRACT

A mixed green color fluorescent material for an electric device such as a plasma display panel includes: at least a first fluorescent material selected from a Group A defined in a range (0.10≦x≦0.18, 0.70≦y≦0.80) on a chromaticity coordinate; and at least a second fluorescent material selected from a Group B defined in a range (0.25≦x≦0.35, 0.55 ≦y≦0.65) on the chromaticity coordinate.

19 Claims, 3 Drawing Sheets

PLASMA DISPLAY PANEL WITH IMPROVED MIXED GREEN-COLOR FLUORESCENT MATERIAL

BACKGROUND OF THE INVENTION

1. Field of the Invention

The present invention relates to a plasma display panel, and more particularly to an improvement in composition of mixed green-color fluorescent materials for a plasma display panel.

2. Description of the Related Art

In color plasma display panels, it has been known to a person skilled in the art that plural kinds of green-color fluorescent materials are mixed to adjust a chromaticity of green color.

Japanese laid-open patent publication No. 2001-135239 discloses that $Zn_2SiO_4$:Mn fluorescent material and a terbium (Tb) rare earth oxide fluorescent material are mixed to adjust the chromaticity of green color. FIG. 1 is a chromaticity coordinate of $Zn_2SiO_4$:Mn fluorescent material, $YBO_3$:Tb fluorescent material, and $LaPO_4$:Tb fluorescent material. This conventional technique uses the $Zn_2SiO_4$:Mn fluorescent material which is, however, disadvantageous because the $Zn_2SiO_4$:Mn fluorescent material may increase the driving voltage for the plasma display panel. The $Zn_2SiO_4$:Mn fluorescent material is further disadvantageous in fast deterioration in luminance. For those reasons, it is preferable to avoid the use of $Zn_2SiO_4$:Mn fluorescent material as the green color fluorescent material.

In the above circumstances, the development of a novel composition of a mixed green color fluorescent material for adjusting a green color chromaticity in connection with a plasma display panel free from the above problems is desirable.

SUMMARY OF THE INVENTION

Accordingly, it is an object of the present invention to provide a novel composition of a mixed green color fluorescent material for adjusting a green color chromaticity in connection with a plasma display panel free from the above problems.

It is a further object of the present invention to provide a novel composition of a mixed green color fluorescent material for adjusting a green color chromaticity in connection with a plasma display panel, wherein the mixed green color fluorescent material is free of $Zn_2SiO_4$:Mn fluorescent material.

It is a still further object of the present invention to provide a novel composition of a mixed green color fluorescent material for adjusting a green color chromaticity in connection with a plasma display panel, wherein the mixed green color fluorescent material does not cause any substantive increase of the driving voltage for the plasma display panel.

It is yet a further object of the present invention to provide a novel composition of a mixed green color fluorescent material for adjusting a green color chromaticity in connection with a plasma display panel, wherein the mixed green color fluorescent material does not cause any deterioration of luminance of the plasma display panel.

The present invention provides a mixed green color fluorescent material for an electric device such as a plasma display panel. The mixed green color fluorescent material includes: at least a first fluorescent material selected from a Group A defined in a range ($0.10 \leq x \leq 0.18$, $0.70 \leq y \leq 0.80$) on a chromaticity coordinate; and at least a second fluorescent material selected from a Group B defined in a range ($0.25 \leq x \leq 0.35$, $0.55 \leq y \leq 0.65$) on the chromaticity coordinate.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
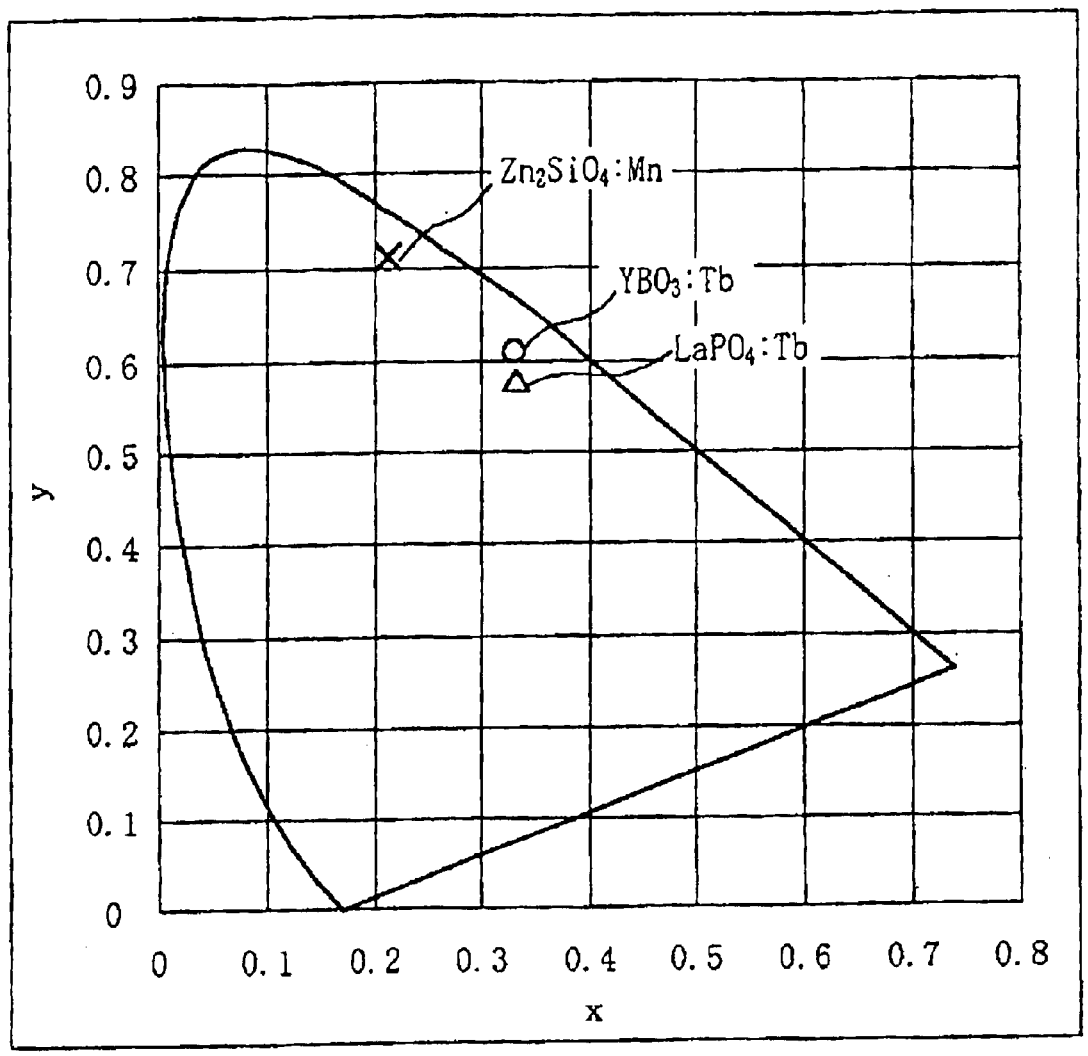
FIG. 1 is a chromaticity coordinate of $Zn_2SiO_4$:Mn fluorescent material, $YBO_3$:Tb fluorescent material, and $LaPO_4$:Tb fluorescent material.

A first aspect of the present invention is a mixed green color fluorescent material for a display. The mixed green color fluorescent material includes: at least a first fluorescent material selected from a Group A defined in a range ($0.10 \leq x \leq 0.18$, $0.70 \leq y \leq 0.80$) on a chromaticity coordinate; and at least a second fluorescent material selected from a Group B defined in a range ($0.25 \leq x \leq 0.35$, $0.55 \leq y \leq 0.65$) on the chromaticity coordinate.

It is preferable that the at least first fluorescent material selected from the Group A includes a manganese activated aluminate fluorescent material.

It is also preferable that the at least second fluorescent material selected from the Group B includes at least one of a terbium activated phosphate fluorescent material, and a terbium activated borate fluorescent material.

It is also preferable that the at least first fluorescent material selected from the Group A and the at least second fluorescent material selected from the Group B are mixed at such mixing ratios for exhibiting substantially equal luminances to each other.

It is also preferable to further include at least a test fluorescent material which exhibits luminescence under an ultraviolet ray.

It is also preferable that the mixed green color fluorescent material includes at most 5 percents by volume of the at least test fluorescent material.

It is also preferable that the mixed green color fluorescent material is free of $Zn_2SiO_4$:Mn fluorescent material.

It is also preferable that the mixed green color fluorescent material is provided in a plasma display panel.

A second aspect of the present invention is a plasma display panel having a mixed green color fluorescent material. The mixed green color fluorescent includes: at least a first fluorescent material selected from a Group A defined in a range ($0.10 \leq x \leq 0.18$, $0.70 \leq y \leq 0.80$) on a chromaticity coordinate; and at least a second fluorescent material selected from a Group B defined in a range ($0.25 \leq x \leq 0.35$, $0.55 \leq y \leq 0.65$) on the chromaticity coordinate.

It is also preferable that the at least first fluorescent material selected from the Group A includes a manganese activated aluminate fluorescent material.

It is also preferable that the at least second fluorescent material selected from the Group B includes at least one of a terbium activated phosphate fluorescent material, and a terbium activated borate fluorescent material.

It is also preferable that the at least first fluorescent material selected from the Group A and the at least second fluorescent material selected from the Group B are mixed at such mixing ratios for exhibiting substantially equal luminances to each other.

It is also preferable to further include at least a test fluorescent material which exhibits luminescence under an ultraviolet ray.

It is also preferable that the mixed green color fluorescent material includes at most 5 percents by volume of the at least test fluorescent material.

It is also preferable that the mixed green color fluorescent material is free of $Zn_2SiO_4$:Mn fluorescent material.

Figure 2:
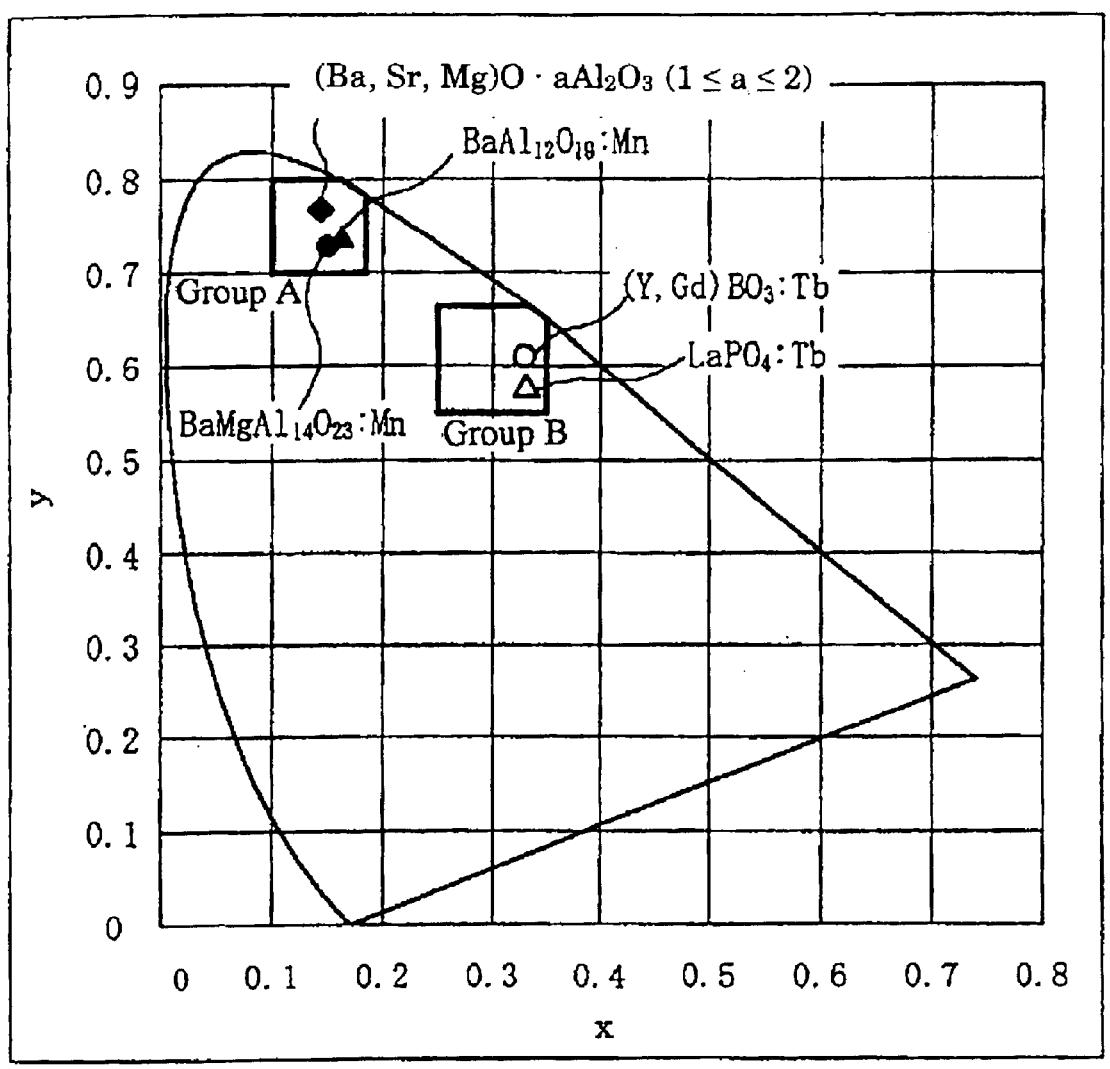
FIG. 2 is a chromaticity coordinate of plural green color fluorescent materials used in a plasma display panel in accordance with the present invention.

A preferred embodiment according to the present invention will be described in detail with reference to the drawings. FIG. 2 is a chromaticity coordinate of plural green color fluorescent materials used in a plasma display panel in accordance with the present invention.

In accordance with the preferred embodiment of the present invention, the mixed green color fluorescent material comprises a mixture of at least a first green color fluorescent material selected from the Group A and also at least a second green color fluorescent material selected from the Group B. The Group A is defined in a range ($0.10 \leq x \leq 0.18$, $0.70 \leq y \leq 0.80$) on the chromaticity coordinate of FIG. 1. The Group B is defined in a range ($0.25 \leq x \leq 0.35$, $0.55 \leq y \leq 0.65$) on the chromaticity coordinate of FIG. 1. The first type green color fluorescent materials selected from the Group A may advantageously include manganese activated aluminate fluorescent materials, for example, typically $BaMgAl_{14}O_{23}$:Mn, $BaAl_{12}O_{19}$:Mn, and (Ba, Sr, Mg)O•a$Al_2O_3$($1 \leq a \leq 2$). The second type green color fluorescent materials selected from the Group B may advantageously include terbium activated phosphate fluorescent materials, for example, typically $LaPO_4$:Tb, and further terbium activated borate fluorescent materials, for example, typically $YBO_3$:Tb, and (Y, Gd)$BO_3$:Tb.

Preferably, selections of one or more first type green color fluorescent materials from the Group A and one or more second type green color fluorescent materials from the Group B as well as mixing ratio of the selected fluorescent materials may advantageously be made by taking into account an intended chromaticity of the mixed green color fluorescent material. For example, if a chromaticity of (x, y)=(0.213, 0.701) is intended and required, then (Ba, Sr, Mg)O•a$Al_2O_3$($1 \leq a \leq 2$) may be selected from the Group A, while (Y, Gd)$BO_3$:Tb may be selected from the Group B, wherein both (Ba, Sr, Mg)O•a$Al_2O_3$($1 \leq a \leq 2$) and (Y, Gd)$BO_3$:Tb are substantially equal in luminance to each other. Then, both may be mixed at 60% by volume of (Ba, Sr, Mg)O•a$Al_2O_3$($1 \leq a \leq 2$) and 40% by volume of (Y, Gd)$BO_3$:Tb to obtain the above intended chromaticity. The mixing ratio may be decided by a person having ordinary skilled in the art, based on additive mixing in chromaticity of the respective green color fluorescent materials.

In accordance with the mixed green color fluorescent material in the above preferred embodiment of the present invention, $Zn_2SiO_4$:Mn is not used as the green color fluorescent material. It was confirmed by the inventor that the mixed green color fluorescent material described above is preferably applicable to the plasma display panel, thereby allowing the plasma display panel to achieve a 15%-reduction of the driving voltage and also a 6%-improvement in deterioration rate of the green-color luminance after 1000 hours.

It is also possible to select one or more first type green color fluorescent materials from the Group A and also one or more second type green color fluorescent materials from the Group B, wherein the selected fluorescent materials may exhibit different luminances from each other, provided that the mixing ratio is adjusted to obtain the intended chromaticity of the mixed green color fluorescent material. For example, (Ba, Sr, Mg)O•a$Al_2O_3$($1 \leq a \leq 2$) may be selected from the Group A, while (Y,Gd)$BO_3$:Tb may be selected from the Group B, even (Ba, Sr, Mg)O•a$Al_2O_3$($1 \leq a \leq 2$) and (Y,Gd)$BO_3$:Tb are different in luminance from each other. Since a relative luminance of (Ba, Sr, Mg)O•a$Al_2O_3$ ($1 \leq a \leq 2$) is 100, while a relative luminance of (Y,Gd)$BO_3$:Tb is 120, in order to obtain a chromaticity of (x, y)=(0.213, 0.701), it may be possible that 55.6% by volume of (Ba, Sr, Mg)O•a$Al_2O_3$ ($1 \leq a \leq 2$) and 44.4% by volume of (Y,Gd)$BO_3$:Tb are mixed.

Further, it is, of course, possible that plural first type green color fluorescent materials may be selected from the Group A and/or plural second type green color fluorescent materials may be selected from the Group B, wherein the mixing ratios may be adjusted to obtain an intended chromaticity of the mixed green color fluorescent material. As long as $Zn_2SiO_4$:Mn is not used as the green color fluorescent material, the mixed green color fluorescent material is preferably applicable to the plasma display panel, thereby allowing the plasma display panel to achieve a certain reduction of the driving voltage and also a certain improvement in deterioration rate of the green-color luminance over time.

As described above, there are no particular limitations to the compositional ratio of one or more first type green color fluorescent materials selected from the Group A and one or more second type green color fluorescent materials selected from the Group B, provided that the compositional ratio may allow the mixed green color fluorescent material to obtain the intended chromaticity, and also that $Zn_2SiO_4$:Mn is not used as the green color fluorescent material to achieve a certain reduction of the driving voltage and also a certain improvement in deterioration rate of the green-color luminance over time.

Figure 3:
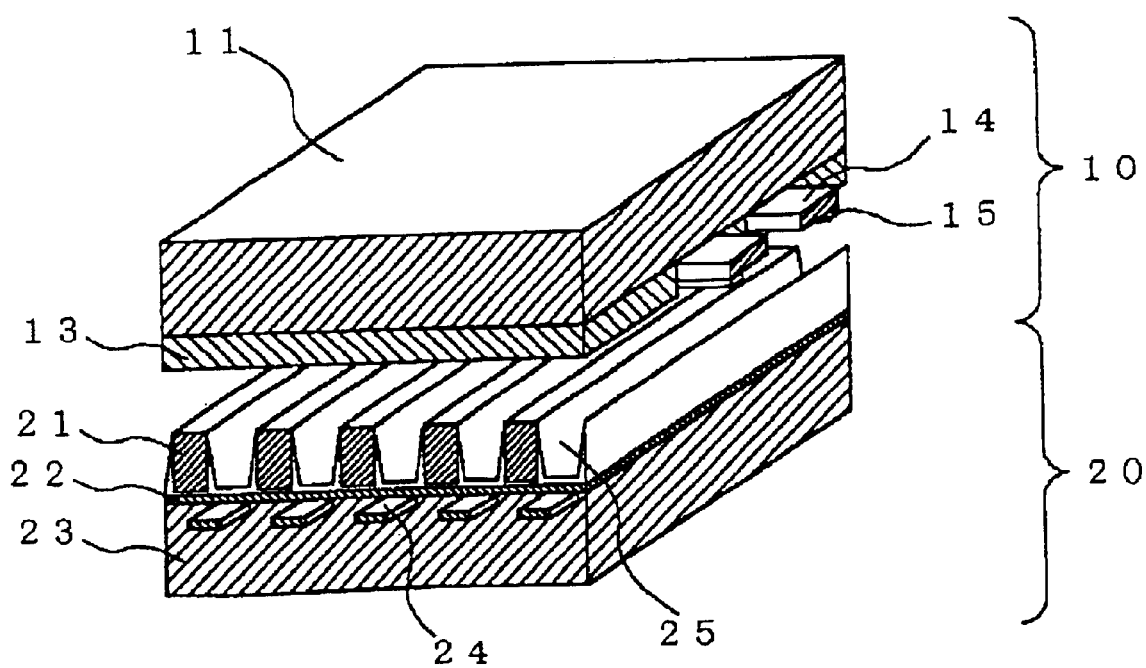
FIG. 3 is a schematic perspective view of one typical example of a fundamental structure of a plasma display panel, to which the mixed green color fluorescent material is applicable in accordance with the present invention.

A typical example of the application of the mixed green color fluorescent material in accordance with the present invention will be described in detail with reference to the drawing. FIG. 3 is a schematic perspective view of one typical example of a fundamental structure of a plasma display panel, to which the mixed green color fluorescent material is applicable in accordance with the present invention.

The plasma display panel may include a front side substrate structure 10 and a back side substrate structure 20. The front side substrate structure 10 may include a first transparent substrate 11, plural sets of a transparent electrode 14 and a bus electrode 15, and a transparent dielectric layer 13. The first transparent substrate 11 may typically comprise a transparent glass substrate, for example, a soda lime glass substrate. The bus electrode 15 is arranged adjacent to the transparent electrode 14 for providing an additional conductivity to the conductivity by the transparent electrode 14. Plural sets of the transparent electrode 14 and the bus electrode 15 are aligned on an inner face of the first transparent substrate 11. The transparent dielectric layer 13 covers the plural sets of the transparent electrode 14 and the bus electrode 15 and the inner face of the first transparent substrate 11. The transparent dielectric layer 13 may optionally and advantageously be coated with a passivation film for protecting the transparent dielectric layer 13. The passivation film may typically comprise magnesium oxide.

The back side substrate structure 20 may include a second transparent substrate 23, a plurality of address electrodes 24, a dielectric layer 22, a plurality of ribs 21 and fluorescent layers 25. The second transparent substrate 23 may typically comprise a transparent glass substrate, for example, a soda lime glass substrate. The address electrodes 24 are aligned in parallel to each other so that the address electrodes 24 extend in a horizontal direction perpendicular to the direction along which the plural sets of the transparent electrode 14 and the bus electrode 15 extend. The dielectric layer 22 covers the address electrodes 24 and the inner face of the second transparent substrate 23. The ribs 21 are aligned on the dielectric layer 22, so that the ribs 21 define gaps providing parts of discharge space, wherein the gaps are positioned over the address electrodes 24. The fluorescent layers 25 are selectively provided on the side walls of the ribs 21 and on the dielectric layer 22 facing to the discharge spaces. The fluorescent layers 25 comprise harmonic arrangements of red-color, green-color and blue-color luminescent layers.

A discharge gas not illustrated is filled in the discharge space defined between the front-side and back-side substrate structures 10 and 20. A discharge causes an ultraviolet ray which may excite a part or parts of the fluorescent layers 25 for display.

After the fluorescent layers 25 has been applied by any available method, for example, a screen-printing method and a dispenser, the fluorescent layers 25 may be subjected to a luminescent test using any available ultraviolet ray source such as an ultraviolet ray lamp, typically, a bactericidal lamp with a center wavelength of 254 nanometers or a black-light with a center wavelength of 357 nanometers.

In order to increase the luminance of the mixed green color fluorescent material and facilitate the test, it may optionally and advantageously be possible to add a small amount of a test-purpose additional fluorescent material into the mixed green color fluorescent material, wherein the amount of the test-purpose additional fluorescent material is so small as providing substantially no influences to the luminescence characteristics of the mixed green color fluorescent material, the driving voltage, and the luminance deterioration characteristic. Typically, the amount of the test-purpose additional fluorescent material is preferably not more than 5% by volume of the mixed green color fluorescent material. Any test-purpose additional fluorescent materials may be available as long as the materials are capable of luminescence upon an ultraviolet ray irradiation. Typical examples of the test-purpose additional fluorescent materials may be ZnO:Zn and $Zn_2SiO_4$:Mn.

It will be apparent to a person skilled in the art that in place of the above-described preferred example, the mixed green color fluorescent material in accordance with the present invention may optionally and advantageously be applicable to any other electric devices and any articles, which need green color fluorescence.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A mixed green color fluorescent material including:
    at least a first fluorescent material selected from a Group A defined in a range ($0.10 \leq x \leq 0.18$, $0.70 \leq y\ 0.80$) on a chromaticity coordinate; and
    at least a second fluorescent material selected from a Group B defined in a range ($0.25 \leq x \leq 0.35$, $0.55 \leq y \leq 0.65$) on said chromaticity coordinate.

2. The mixed green color fluorescent material as claimed in claim 1, wherein said at least first fluorescent material selected from said Group A includes a manganese activated aluminate fluorescent material.

3. The mixed green color fluorescent material as claimed in claim 1, wherein said at least second fluorescent material selected from said Group B includes at least one of a terbium activated phosphate fluorescent material, and a terbium activated borate fluorescent material.

4. The mixed green color fluorescent material as claimed in claim 1, wherein said at least first fluorescent material selected from said Group A and said at least second fluorescent material selected from said Group B are mixed at such mixing ratios for exhibiting substantially equal luminances to each other.

5. The mixed green color fluorescent material as claimed in claim 1, further including at least a test fluorescent material which exhibits luminescence under an ultraviolet ray.

6. The mixed green color fluorescent material as claimed in claim 5, wherein said mixed green color fluorescent material includes at most 5 percents by volume of said at least test fluorescent material.

7. The mixed green color fluorescent material as claimed in claim 1, wherein said mixed green color fluorescent material is free of $Zn_2SiO_4$:Mn fluorescent material.

8. A plasma display panel having at least a mixed green color fluorescent material, said mixed green color fluorescent material including:
    at least a first fluorescent material selected from a Group A defined in a range ($0.10 \leq x \leq 0.18$, $0.70 \leq y \leq 0.80$) on a chromaticity coordinate; and
    at least a second fluorescent material selected from a Group B defined in a range ($0.25 \leq x \leq 0.35$, $0.55 \leq y \leq 0.65$) on said chromaticity coordinate.

9. The plasma display panel as claimed in claim 8, wherein said at least first fluorescent material selected from said Group A includes a manganese activated aluminate fluorescent material.

10. The plasma display panel as claimed in claim 8, wherein said at least second fluorescent material selected from said Group B includes at least one of a terbium activated phosphate fluorescent material, and a terbium activated borate fluorescent material.

11. The plasma display panel as claimed in claim 8, wherein said at least first fluorescent material selected from said Group A and said at least second fluorescent material selected from said Group B are mixed at such mixing ratios for exhibiting substantially equal luminances to each other.

12. The plasma display panel as claimed in claim 8, further including at least a test fluorescent material which exhibits luminescence under an ultraviolet ray.

13. The plasma display panel as claimed in claim 12, wherein said mixed green color fluorescent material includes at most 5 percents by volume of said at least test fluorescent material.

14. The plasma display panel as claimed in claim 8, wherein said mixed green color fluorescent material is free of $Zn_2SiO_4$:Mn fluorescent material.

15. An electric device having at least a mixed green color fluorescent material, said mixed green color fluorescent material including:
- at least a first fluorescent material selected from a Group A defined in a range ($0.10 \leq x \leq 0.18, 0.70 \leq y \leq 0.80$) on a chromaticity coordinate; and
- at least a second fluorescent material selected from a Group B defined in a range ($0.25 \leq x \leq 0.35, 0.55 \leq y \leq 0.65$) on said chromaticity coordinate.

16. The electric device as claimed in claim 15, wherein said at least first fluorescent material selected from said Group A includes a manganese activated aluminate fluorescent material.

17. The electric device as claimed in claim 15, wherein said at least second fluorescent material selected from said Group B includes at least one of a terbium activated phosphate fluorescent material, and a terbium activated borate fluorescent material.

18. The electric device as claimed in claim 15, wherein said at least first fluorescent material selected from said Group A and said at least second fluorescent material selected from said Group B are mixed at such mixing ratios for exhibiting substantially equal luminances to each other.

19. The electric device as claimed in claim 15, wherein said mixed green color fluorescent material is free of $Zn_2SiO_4$:Mn fluorescent material.

* * * * *